United States Patent

Shimomura

[15] 3,699,864
[45] Oct. 24, 1972

[54] DEVICE FOR DRIVING REFLECTING MIRROR OF SINGLE-LENS REFLEX CAMERA

[72] Inventor: Jun Shimomura, Tokyo, Japan
[73] Assignee: Nippon Kogaku K.K., Tokyo, Japan
[22] Filed: Aug. 25, 1970
[21] Appl. No.: 66,688

[30] Foreign Application Priority Data

Aug. 29, 1969  Japan ...................... 44/67945

[52] U.S. Cl. ........................................ 95/42, 355/45
[51] Int. Cl. ........................................... G03b 3/00
[58] Field of Search ............. 95/42, 10 R; 355/45, 68

[56] References Cited

UNITED STATES PATENTS 1,388,870  8/1921  Lipp ...................... 95/42 UX

FOREIGN PATENTS OR APPLICATIONS 890,808  2/1944  France .......................... 95/42

*Primary Examiner*—Samuel S. Matthews
*Assistant Examiner*—Richard A. Wintercorn
*Attorney*—Harry G. Shapiro

[57] ABSTRACT

A device for driving the reflecting mirror of a single lens reflex type camera having a reflecting mirror system and movable part system with a photometric or a light shielding member. The moments of rotation produced by the unbalanced masses of the reflecting mirror system and the movable part system are arranged in opposing relationship, and drive means drive both systems simultaneously, so that both moments of rotation nearly cancel each other out, thereby reducing both the shock caused by movement of the reflecting mirror and the adverse effects upon the movements of the reflecting mirror due to differences in the position of the camera.

5 Claims, 6 Drawing Figures

PATENTED OCT 24 1972　　　　　　　　　　　3,699,864
FIG. 1　　　　FIG. 2
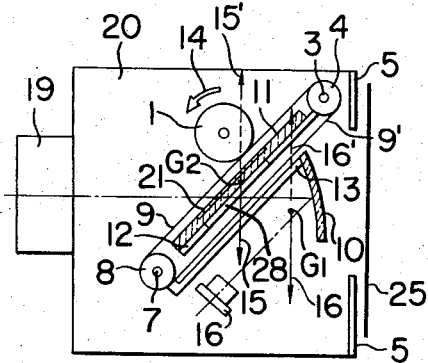
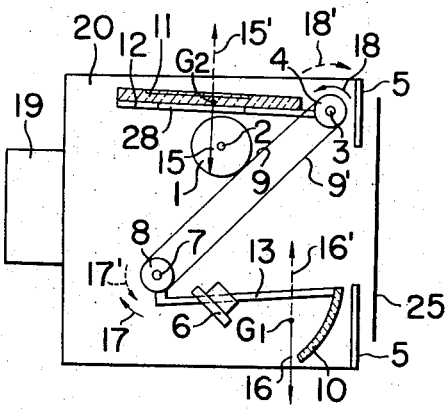
FIG. 3　　　　FIG. 4
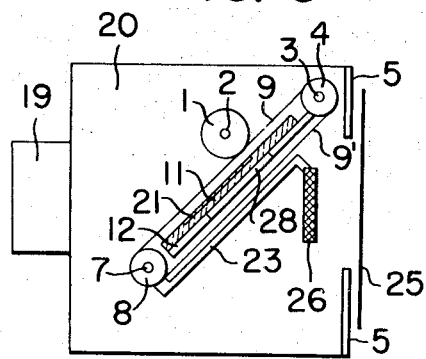
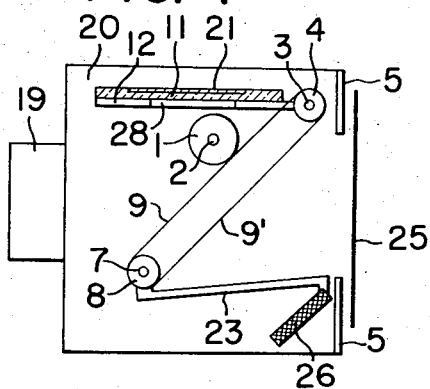
FIG. 5　　　　FIG. 6
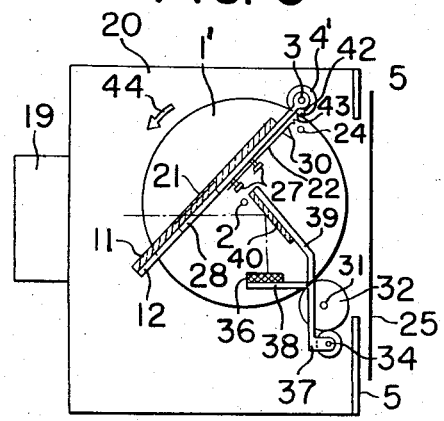
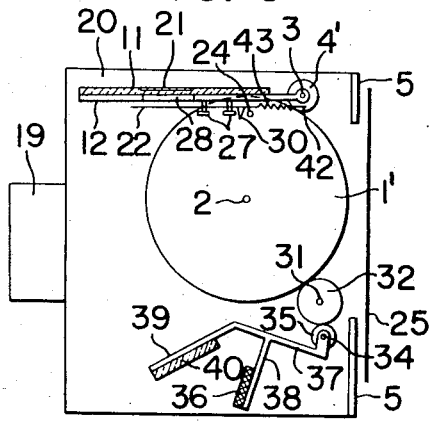
INVENTOR.
JUN SHIMOMURA
BY Harry I. Shapiro
ATTORNEY

A1,699,864

DEVICE FOR DRIVING REFLECTING MIRROR OF SINGLE-LENS REFLEX CAMERA

BACKGROUND OF THE INVENTION

The present invention relates to a device for driving a reflecting mirror in a single-lens reflex camera.

In the art of single lens reflex cameras, it has long been proposed to counterbalance the gravitational force on the reflecting mirror with a weight positioned about the rotary shaft of the mirror in order to reduce the shock when the mirror is rotated and to eliminate the adverse effects upon the motion of the mirror due to different camera positions. However, in practice, the rotary shaft of the main reflecting mirror is generally disposed adjacent to one side of the mirror box, so that the weight can only be placed close to the rotary shaft. Therefore, in order to attain equilibrium with the mirror, the weight must be very heavy. The volume of such a heavy weight is fairly large, even when it is made of a material having a high specific gravity, such as lead. Accordingly, it is almost impossible to provide a sufficiently heavy weight having dimensions suitable to fulfill the desired function.

SUMMARY OF THE INVENTION

The present invention was made to eliminate these related defects. According to the present invention, the use of a weight is eliminated and the moments of rotation of the main reflecting mirror and the movable part systems produced by the unbalanced masses thereof are placed in opposing relation thereby cancelling each other, so that the impact caused by the movement of the reflecting mirror is reduced and the adverse effects upon the movements of the reflecting mirror due to differences in camera position are eliminated. Thus, the present invention provides a device for driving the reflecting mirror of a single-lens reflex camera in which aforesaid disadvantages have been eliminated without using a so-called balance weight or without increasing the forece of the spring for driving the reflecting mirror. Furthermore, because the present invention does not employ a weight, photometry and/or light shielding members having increased dimensions and strength may be advantageously incorporated in the mirror box of the camera.

BRIEF DESCRIPTION OF THE DRAWING

FIG. 1 is a side view of a first embodiment of the present invention having an optical member for photometry as a movable part system in addition to a main reflecting mirror, showing the reflecting mirror and the optical member for photometry positioned in reflecting position;

FIG. 2 is a similar view of FIG. 1, showing the reflecting mirror and the optical member for photometry retracted from the light path;

FIG. 3 is a side view of a second embodiment of the present invention in which the movable part system includes a photoelectric member for photometry in addition to the main reflecting mirror, showing the reflecting mirror and the photoelectric member positioned in reflecting position;

FIG. 4 is similar view to FIG. 3, showing the reflecting mirror and the photoelectric member for photometry retracted from the light path;

FIG. 5 is a side view of a third embodiment of the present invention in which the main reflecting mirror system includes a plate for shielding the light, while the movable part system includes an optical member and a photoelectric member;

FIG. 6 is similar to FIG. 5, showing the reflecting mirror system and the movable part system retracted from the light path.

DESCRIPTION OF THE PREFERRED EMBODIMENTS

The present invention will be described in detail with reference to the illustrative embodiments.

Referring to the first embodiment of FIGS. 1 and 2, a main reflecting mirror 11 is mounted upon a reflecting mirror supporting plate 12, and a rotary shaft 3 for the supporting plate 12 is pivotably fixed to a wall 20 of a mirror box in a camera body. A pulley 4 which is made integral with the supporting plate 12 is carried by the rotary shaft 3 and is coupled to a pulley 8 through a flexible members 9 and 9'. A rotary shaft 7 of the pulley 8 is pivotably fixed to the inner wall 20 of the mirror box. An optical element supporting member 13 is made integral with the pulley 8. In the first embodiment, an optical component 10 is a concave mirror which is supported by the supporting member 13. The optical member 10 serves to direct the light beam which is passed through a photographing lens 19, a semi-transparent mirror portion 21 of the main reflecting mirror 11 and an opening 28 of the supporting plate 12 to a photoelectric element 6 such as a CdS element.

A drive pulley 1 is rotatably mounted by a shaft 2 to the inner wall 20 of the mirror box. Around the drive pulley 1 the flexible members 9 and 9' are wound several times, so that both of the pulleys 4 and 8 are driven through the flexible members 9 and 9'. An aperture 5 in the back of the mirror box defines a picture frame with respect to the film 25. The photoelectric element 6 is securely fixed to the bottom of the mirror box.

In the ordinary photographing position shown in FIG. 1, the center of gravity of the unbalanced mass of the main reflecting mirror system (4, 11 and 12) is $G_2$ while the center of gravity of the movable part system or movable photometric system (8, 10 and 13) is $G_1$. The vectors of gravity acting upon these centers are indicated by 15 and 16 respectively.

As is clear from FIG. 1, the movable part system (8, 10 and 13) usually tends to rotate about the shaft 7 in the direction indicated by the arrow 17 while the main mirror system (4, 11 and 12) usually tends to rotate in the direction indicated by the arrow 18 about the shaft 3. The magnitudes of the unbalanced masses of both of the main mirror system (4, 11 and 12) and the movable part system (8, 10 and 13) and the lengths of their moment about their axes are so selected that the magnitudes of tension acting upon the flexible members 9 and 9' which interconnect the two systems, are equal but in the opposite directions. Therefore, the influence of gravity upon the main reflecting mirror system 4, 11 and 12 may be nearly cancelled by the influence of gravity upon the movable part system 8, 10 and 13. Furthermore, both of the systems are coupled to the common driving source 1 so that when the driving source 1 is rotated in the direction indicated by the arrow 14, the two systems are retracted from the light path for exposing the film 25 to the positions as shown in FIG. 2. In this position, the influence of gravity upon the main reflecting mirror system (4, 11 and 12) is also nearly cancelled by the influence of gravity upon the movable part system (8, 10 and 13).

To investigate the function of the apparatus when the camera position is changed, the camera is turned upside down. Then, the gravitational force acts upon the centers $G_1$ and $G_2$ as shown by 15' and 16' so that the main reflecting mirror system (4, 11 and 12) tends to rotate about the shaft 3 in the direction indicated by the arrow 18' while the movable part system (8, 10 and 13) tends to rotate about the shaft 7 in the direction indicated by the arrow 17'. Consequently, the influence of gravity upon the main reflecting mirror system is also nearly cancelled by that upon the movable part system. Therefore, when both of the systems are retracted from the light path by the rotation of the driving member 1 about a shaft 2, the relationship between the force of gravity acting upon the two systems will remain unchanged without regard to the difference of the camera position.

In the conventional reflecting mirror device, there is an imbalance between the mass of the main reflecting mirror system and that of the movable part system which is retracted from the light path for exposure so that a very large driving force must be provided by the driving member 1 to overcome the influence of the unbalanced mass. In contrast, the driving force required in the present invention is significantly smaller than that required in the conventional device. Furthermore, in the present invention the impact caused when the two system are retracted and returned to their initial positions is smaller than that caused in the conventional device.

Referring to FIGS. 3 and 4, the second embodiment has a similar structure with the first embodiment except that instead of the optical member 10 in the first embodiment, a photoelectric element 26 is fixed to a support 23 made integral with the pulley 8. The only difference between the first and second embodiment is the latter comprises the photoelectric element 26 in the movable part system 7, 23 and 26. The equilibrium of force is maintained as described hereinabove with reference to the first embodiment.

In the first and second embodiments, the semi-transparent portion 21 of the main reflecting mirror must be shielded when the main reflecting mirror system is raised. A third embodiment will be described with reference to FIGS. 5 and 6 which provides the required shielding. A shield plate 22 is held by the main reflecting mirror supporting plate 12 through guide pins 27 in such a manner that the shield 22 may close the opening 28 which is positioned opposite to the semi-transparent portion 21 of the main reflecting mirror 11. The shield 22 is normally biased by means of a spring 43 toward the rotary shaft 3 of the main reflecting mirror. The shield 22 is further provided with a member 30 which is adapted to engage with a pin 24 extending from a driving gear 1'. A photometry arm 37 carrying both an optical member 40 and a photoelectric element 36 integrally is rotatably fixed to the inner wall 20 by a shaft 34. The photometry arm 37 is made integral with the gear 35 which is in mesh with an intermediate gear 32 carried by a shaft 31 and the gear 32 is in mesh with the drive gear 1'.

The gravitational force exerting upon the main reflecting mirror system (4, 11, 12, 22, 27, 30, 42 and 43) including the shield 22 produces a moment which tends to cause this system to rotate about the shaft 3 in the counterclockwise direction in FIG. 5. On the other hand, the gravitational force acting upon the photometry system (35, 36, 37 and 38) produces a moment which causes this system to rotate about the shaft 34 in the counterclockwise direction in FIGS. 5 and 6. In consequence, the pair of moments about the rotary shaft 2 of the drive gear 1' coupling the two systems are balanced so that the influence of the gravity upon the main reflecting mirror system is nearly cancelled by that upon the movable part system. As in the case of the first and second embodiments, when the camera is turned upside down only the direction of the gravitational force is changed, which does not change the above relationship.

Upon rotation of the drive gear 1' in the direction indicated by the arrow 44 in FIG. 5, the gear 4' engaged with drive gear 1', is caused to rotate in the clockwise direction so that the main reflecting mirror system (4, 11, 12, 22, 27, 30, 42 and 43) rotates also in the clockwise direction. During this rotation, the pin 24 of the drive gear 1' engages with the projection 30 of the shield 22 so that the shield 22 is caused to move toward the left against the spring 43. Consequently, the shield 22 closes the opening 28 of the supporting plate 12 opposite the semi-transparent portion 21 of the main reflecting mirror 11 as shown in FIG. 6 so that the light rays from a viewfinder (not shown) are prevented from entering into the mirror box when the film 25 is exposed. In this case, both the photoelectric element 36 and the optical member 40 are retracted from the light path for exposure, by the rotation of gear 1' in the counterclockwise direction.

In the third embodiment, the shield system (22, 27, 30, 42 and 43) is added to the main mirror system so that the unbalanced mass or moment of the main reflecting mirror system is slightly increased. However, the photometry system, that is the movable part system (39, 40, 36, 37, 38 and 35) is arranged to balance with the unbalanced mass or moment of the main reflecting mirror system so that there is no problem from movement of the main reflecting mirror system and the movable part system to the photographing position, or from impact caused by the movement. Thus, a shield plate having increased dimensions and strength may be incorporated in the camera. Needless to say, optical members and photoelectric elements having increased strength and dimensions may also be incorporated in the camera for the same reasons.

It will be understood that the movable parts are not limited to the photometric members such as optical members and photoelectric elements. For example, in the case of a single-lens reflex camera having a between-lens shutter, the shield for closing the exposure aperture may be arranged in accordance with the present invention.

In the above embodiments, both the main reflecting mirror and movable part systems have been described as being rotatably carried by rotary shafts fixed to the mirror box, but a suitable linkage may also be employed. In that case, the influence of the gravity exerting upon the systems will become a function of the postions of link elements or bars so that it may be difficult to precisely balance the influence of the gravity acting upon the linkage But the objects of the present invention may be attained in practice by selecting, with a sufficient degree of accuracy the dimensions and weights of the link elements or bars in such a manner that the equilibrium of forces may be attained at several selected points in the paths of motions.

What is claimed is:

1. In a single lens reflex camera having apertures forming a light path, a device for driving a reflecting mirror comprising a main reflecting mirror rotatably mounted in the camera; a photometric system including at least one of a photoelectric member and an optical member rotatably mounted in the camera; the moment of rotation of the photometric system being substantially equal to the moment of rotation of the main reflecting mirror; and drive means for retracting the main reflecting mirror from the light path, the drive means coupling the main reflecting mirror and the photometric system to simultaneously rotate in opposite directions so that the moments of rotation of the main reflecting mirror and the photometric system will be in opposed relation and cancel each other.

2. In a single lens reflex camera according to claim 1 wherein the photometric system includes a support member rotatably mounted in the camera; and a photoelectric element mounted on the support member.

3. In a single lens reflex camera according to claim 1 wherein the photometric system includes a support member rotatably mounted in the camera; and an optical member mounted on the support member.

4. In a single lens reflex camera according to claim 1 wherein the photometric system includes a support member rotatably mounted in the camera; a photoelectric element and an optical member fixed in spaced relation on the support member.

5. In a single lens reflex camera according to claim 1 further comprising a light shielding member connected to the main reflecting mirror and slidable between a position for shielding light from the mirror and a position for passing light from the mirror.

* * * * *